Figure 1:
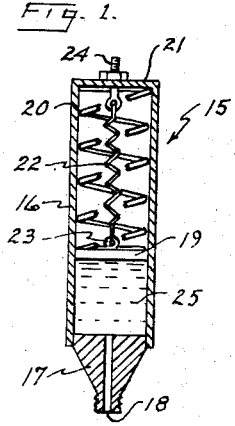

Oct. 26, 1965  T. R. LININGTON  3,214,067
FLUID DISPENSER
Filed Sept. 11, 1962  2 Sheets-Sheet 1

INVENTOR.
THOMAS R. LININGTON
BY
AGENT

Oct. 26, 1965
T. R. LININGTON
3,214,067
FLUID DISPENSER
Filed Sept. 11, 1962
2 Sheets-Sheet 2
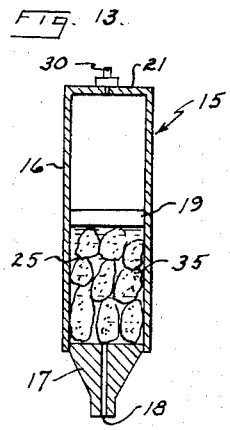
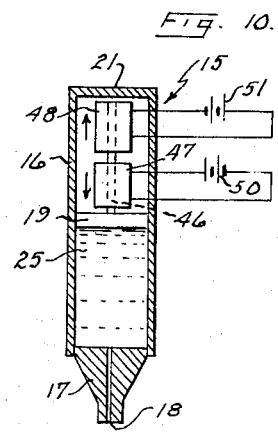
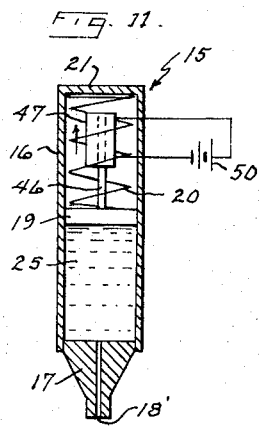
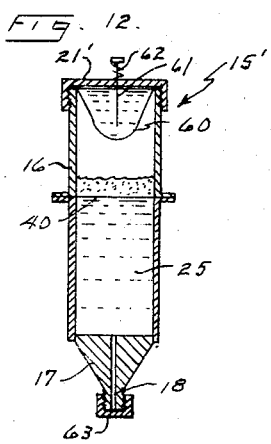
INVENTOR.
THOMAS R. LININGTON
BY Howard J. Jeandron
AGENT

United States Patent Office 3,214,067
Patented Oct. 26, 1965

3,214,067
FLUID DISPENSER
Thomas R. Linington, 82 Hazlet Ave., Hazlet, N.J.
Filed Sept. 11, 1962, Ser. No. 222,873
2 Claims. (Cl. 222—341)

This invention relates to a method of utilizing two equal opposed forces wherein one force has a slow deflection with time and the yield past the equalized starting point is utilized to produce an exceedingly slow force for work such as dispensing a flowable material from a chamber.

In utilizing two equal opposed forces to perform an exceedingly slow method of dispensing a liquid there are a number of possible ways of inducing opposed forces to carry out the intent of this invention. The forces may be entirely mechanical in nature, they may be fluids as pneumatic or hydraulic, they may be chemical in nature or they may be electrical and of course the forces may be mixed, that is, a mechanical force opposite a fluid force or any other combination. Referring to the first method of utilizing opposing forces we may provide an elastic material or two resilient elements such as helical springs in opposed relation as strictly a mechanical force. If the springs are entirely equal in every respect and a static loading is imposed equally on both springs, there would be no movement under this constant load as the deflection of each spring would be equal. However if two springs of different nature are positioned under equal static loading due to this difference in the springs, the deflection of one may vary considerably from the deflection of the opposed spring. In fact if one spring is of one material such as a chrome vanadium and alloy steel while the other spring is of a Phosphor bronze, although they may be initially loaded under equal compression to a peak static stress which is approaching or to the elastic limit or yield point, in this instance the spring of Phosphor bronze due to its fatigue loading, there will be a fatigue failure as the spring has reached its yield point or the limit of its endurance range and it will deflect, the degree of deflection varying according to other factors. The deflection of a spring may also be a result of a physical change known as plastic flow of the material. It is this deflection that is utilized to produce a force in one direction moving a piston or diaphragm to dispense a fluid. The mechanical action of spring against spring may be with two springs acting in compression or with one spring acting in compression against the other spring acting in tension with the same result. Although we have compared a chrome vanadium alloy steel spring with a Phosphor bronze spring, we may make any combination of the various springs whether they be the small spring of carbon steel, cold wound and known as music wire or the larger springs such as the 1% carbon steel formed hot and heat treated after forming or stainless steel, etc. The principal type of spring utilized for this invention is the helical spring although other type springs such as the torsion bar or leaf spring may be utilized. Another consideration in the spring design to be considered is the variation in dimension as a 1% variation in dimension may result in a 7% change in load deflection. Thus although two springs may be equally loaded in a static loading, if one spring varies in its dimension the elastic limit and deflection of the one spring will be affected by the change in dimension. The principal of this opeartion may also be obtained utilizing an air, gas or hydraulic fluid as one of the operating forces acting or opposing a mechanical force such as a spring. In this instance the air, gas or hydraulic fluid does not have a deflection point or a fatigue loading but the spring does and under the constant pressure of the fluid, the spring will deflect and it is this movement under the fatigue loading and the degree of deflection that is utilized to produce the necessary force in the dispensing of a flowable material. The same results may be obtained by a chemical reaction. A chemical or a combination of chemicals may be provided on one side of the piston. In this instance the chemicals utilized produce a gas by their combination. Thus if the reaction is produced slowly, the gas will be continually produced and will by degrees move the pitson and dispense the flowable material. If a force is produced by a chemical reaction, this will produce a movement of the piston. The reaction may be a slow chemical reaction and this produces a growing force which may be of a considerable degree and this force will produce a movement of the piston, this movement is thus utilized for the dispensing of a fluid. The same results may be obtained by an electrical reaction, that is, two opposed forces may be induced by electrical reaction and the opposed forces may be equal such as two solenoids of equal value operated in opposed relation. Initially the piston will be held in a balanced relation if each solenoid is connected to a battery to produce the same initial potential. However if one battery has a six-hour endurance range while the other battery has a 30-hour endurance range it is apparent that as the one battery reaches or approaches its endurance range the potential to that relay will begin to fall off and there will be a deflection of the piston and as the one battery loses its potential, the deflection will continue for the full stroke of the solenoid. Thus a definite movement of the piston over a predetermined range and in a predetermined time can be designed so that the piston may be utilized for the dispensing of a fluid according to the calculated potential life of the battery. This same balancing of electrical potential may be provided in various ways with resistances to produce a similar result so that the dispensing action is entirely a result of a variance in electrical reaction.

Therefore it is an object of this invention to provide a means of dispensing a fluid wherein two equal opposed static forces are utilized and in which at least one of the forces is loaded to its elastic limit or yield point and in which there will be a deflection due to the relaxation of the one force producing a slow deflection or movement in one direction which is utilized for the dispensing action.

A further object of this invention is to provide a means of dispensing a fluid wherein two equal opposed mechanical static forces are utilized and in which at least one of the forces is loaded to its elastic limit or yield point and in which there will be a deflection due to the relaxation of the one force producing a slow deflection or movement in one direction which is utilized for the dispensing action.

A still further object of this invention is to provide a means of dispensing a fluid wherein two equal opposed forces are equalized in which one force is a static mechanical force and the opposing force is a fluid force and in which the mechanical force is loaded to its elastic limit or yield point and in which there will be a deflection due to the relaxation of the material in the mechanical force producing a slow deflection or movement in one direction which is utilized for the dispensing action.

A still further object of this invention is to provide a means of dispensing a fluid wherein two equal opposed mechanical static forces are utilized and in which an auxiliary chemical reaction is added to one of the forces and in which the force opposed to the one which the auxiliary force is added to is loaded to its elastic limit or yield point and in which there will be a deflection due to the relaxation of the material in the mechanical force producing a slow deflection or movement in one direction which is utilized for the dispensing action.

A still further object of this invention is to provide a means of dispensing a fluid wherein two equal opposed forces produced by electrical potential are utilized and in which the potential of one has a shorter life than the potential of the other and in which there will be a movement of the forces in one direction as the shorter life potential is used up to thus produce the dispensing action.

A still further object of this invention is to provide a means of dispensing a fluid wherein two equal opposed forces are utilized in which one is produced by either pneumatic fluid or by mechanical means and the other is produced by an electrical reaction and in which the electrical reaction is produced by a potential source and in which the potential source has a predetermined life and in which the opposed force produced by the electrical reaction breaks down as the potential is reduced during its expiring life and in which there will be a movement of the forces in one direction as the electrical reaction expires to thus produce the dispensing action.

A still further object of this invention is to provide a means of dispensing a fluid wherein two equal opposed forces are utilized in which one may be produced by a helical spring with a static loading and in which the opposite force is produced by the compression of a material such as sponge rubber and in which there will be a movement of the forces in one direction due to the flow of the material in the sponge rubber and in which this movement of the forces will produce the dispensing action.

Figure 2:
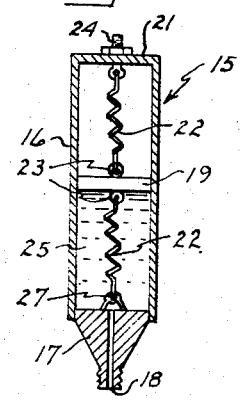
Figure 3:
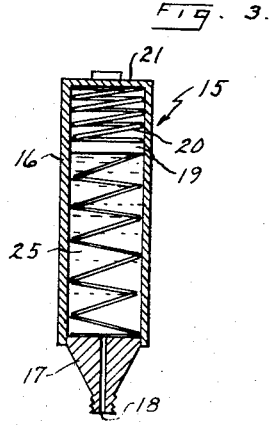
Figure 4:
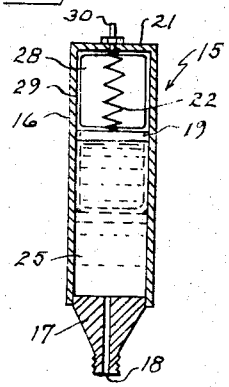
Figure 5:
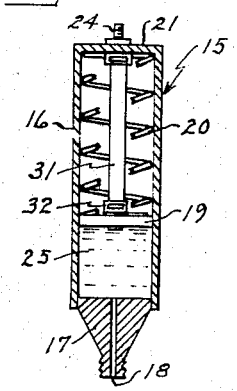
Figure 6:
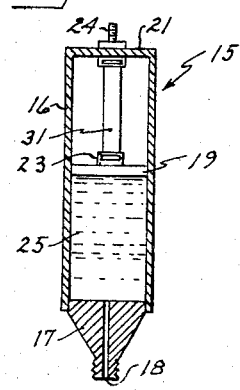
Figure 7:
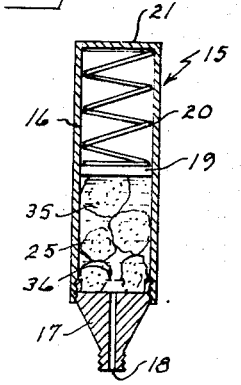
Figure 8:
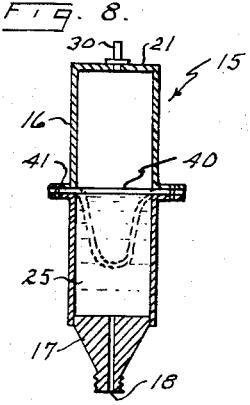
Figure 9:
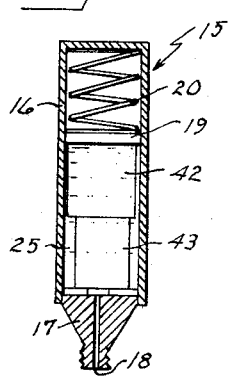

Other objects of this invention shall be apparent by reference to the accompanying detailed description and the drawings in which FIG. 1 is a cross sectional view through a dispensing device utilizing a pair of opposed springs on one side of the piston, FIG. 2 is a view similar to FIG. 1 of a dispensing device utilizing a pair of opposed springs one on each side of the piston, FIG. 3 is a view similar to FIG. 1 of a dispensing device utilizing a pair of opposed springs one on each side of the piston, FIG. 4 is a view similar to FIG. 1 of a dispensing device utilizing a fluid on one side of the piston and a spring on the same side, FIG. 5 is a view similar to FIG. 1 of a dispensing device utilizing an elastic element and a spring on one side of the piston, FIG. 6 is a view similar to FIG. 1 of a dispensing device utilizing a stretchable element on one side of the piston and a gas on the same side of the piston, FIG. 7 is a view similar to FIG. 1 of a dispensing device utilizing a spring on one side of the piston and a compressible material on the opposite side of the piston, FIG. 8 is a view similar to FIG. 1 of a dispensing device utilizing a dividing diaphragm with a fluid pressure on one side, FIG. 9 is a view similar to FIG. 1 of a dispensing device utilizing a spring on one side of the piston and a blade and cuttable material on the opposite side, FIG. 10 is a view similar to FIG. 1 of a dispensing device utilizing a pair of opposed solenoids on one side of the piston, FIG. 11 is a view similar to FIG. 1 of a dispensing device utilizing a solenoid and a spring on one side of the piston, FIG. 12 is a view similar to FIG. 1 of a dispensing device utilizing a chemical on one side of a diaphragm, and FIG. 13 is a view similar to FIG. 1 of a dispensing device utilizing a gas on one side of the piston and a compressible material on the opposite side.

Referring to the use of forces for the method of producing a slow dispensing action for dispensing of a fluid such as a lubricant where it is intended to maintain a film of lubricant on a bearing surface and where the feed of the lubricant to the bearing surface must be maintained over a long period of time but at a very slow rate of dispensing or ejecting, the embodiment shown in FIG. 1 illustrates one form of dispensing element 15 comprised of a tubular structure 16 with a dispensing end 17 having a dispensing port 18 and in which there is a piston 19 within the tubular element 16. The piston 19 is maintained in a predetermined position by inserting a compression spring 20 between piston 19 and the end 21 of the tubular structure 16. To maintain a predetermined position there is also inserted a tension spring 22 that is affixed to the piston 19 at the point 23 and spring 22 is adjustably affixed to the end 21 by a threaded element 24. The chamber below piston 19 may be filled with a lubricating fluid 25. Thus in the position as illustrated in FIG. 1, the compression spring 20 will be statically loaded to oppose the tension spring 22 and by means of the threaded element 24, the two springs may be adjusted to an exact balance as illustrated. The static loading of springs 20 and 22 are necessarily a loading of one spring to a cold flow deflection or a point at which the spring reaches its elastic limit and in this particular embodiment it is necessarily the spring 22 that must be loaded to its limit of elasticity so that as the material or metal in spring 22 yields or flows under load there is a deflection or further extension of spring 22 and as this relaxation of the spring is produced by the opposite load or force of spring 20, the piston 19 will move downward until there is a complete breakdown of spring 22 and spring 20 produces a complete extrusion or dispensing of the flowable material 25 which occurs over an extremely long duration of time.

Referring to FIG. 2 there is also illustrated a dispensing device 15 similarly comprised of a tube 16 with a closed end 21 and provided with a disensing end 17 that is provided with a dispensing port 18 and the tube is provided with a piston 19. However in this embodiment there are a pair of opposed tension springs 22 which are affixed in opposed relation, that is, the upper spring 22 is affixed to the piston at 23 and to a threadably secured element 24 in the upper end while the lower spring 22 is affixed to a similar element 23 at the piston and affixed to an element 27 at the dispensing end. In this embodiment the upper spring 22 must be statically loaded to its elastic limit so that under the continuous pull of the lower spring 22 the upper spring 22 will deflect and relax permitting a movement of piston 19 downward to extrude or dispense the liquid 25 in the lower chamber and the stroke of piston 19 will be for the full movement or closing of the lower spring 22 to thus dispense the flowable material or lubricant as desired.

Referring to FIG. 3 there is also illustrated a dispensing device 15 similarly comprised of a tube 16 with a closed end 21 and provided with a dispensing end 17 that is provided with a dispensing port 18 and the tube is provided with a piston 19. However in this embodiment there are a pair of opposed compression springs 20 and $20^1$ which are positioned in opposed relation one on either side of the piston 19. In this embodiment the one spring must be statically loaded to its deflection limit so that under the continuous downward push of the upper spring 20 the lower spring $20^1$ with an upward push will deflect and relax permitting a movement of piston 19 downward to extrude or dispense the liquid 25 in the lower chamber and the stroke of piston 19 will be for the full movement of expansion of the upper spring downward and the relaxation or deflection of the other spring $20^1$ will thus allow the dispensing of the flowable material or lubricant.

Referring to FIG. 4 there is also illustrated a dispensing device 15 similarly comprised of a tube 16 with a closed end 21 and provided with a dispensing port 18 and the tube is provided with a piston 19. However, in this embodiment there is a combination of a mechanical force opposing a fluid force, the mechanical force being a torsion spring 22 on the upper side of piston 19 and the fluid force being a pneumatic compressible fluid 28 filling the upper chamber above piston 19. The fluid force may be contained within a stretchable bladder 29 with a valve and neck portion 30 extending through the upper wall 21. Thus spring 22 may be statically loaded by introducing the pneumatic or fluid pressure through 30 until the pressure in the upper chamber extends spring 20 to its elastic limit. Spring 22 will under this loading gradually deflect and relax permitting piston 19 to move downward under the fluid pressure load thus extruding or dispensing the flowable material 25 over the duration of time in which spring 22 deflects.

Referring to FIG. 5 there is also illustrated a dispensing device 15 similarly comprised of a tube 16 with a closed end 21 and provided with a dispensing end 17 that is provided with a dispensing port 18 and the tube is provided with a piston 19. However, in this embodiment there is provided a compression spring 20 on the upper side of piston 19 and to restrain piston 19 from moving downward under the influence of spring 20 there is provided a stretchable band 31 that is attached to the upper side of piston 19 at 32 and attached to the under side of the end 21. By means of an adjustable threaded element 24 band 31 may be taken up to provide the predetermined static loading of spring 20. The band 31 will under the static load produced by spring 20 stretch according to the yield or flow of the material of which band 31 is composed and permit a downward movement of piston 19 for the full extension of spring 20 thus extruding or dispensing the flowable material 25.

Referring to FIG. 6 there is also illustrated a dispensing device 15 similarly comprised of a tube 16 with a closed end 21 and provided with a dispensing end 17 that is provided with a dispensing port 18 and the tube is provided with a piston 19. However, in this embodiment there is provided a compressible gas in the upper chamber which may be charged therein by means of a valve and neck portion 30 extending through the upper wall 21. Also within the upper chamber there is an elastic band 31 on the upper side of piston 19. The band 31 is attached to the upper side of piston 19 at 23 and to the under side of the end 21 by an adjustable threaded element 24. With a gas pressure in the upper chamber, piston 19 will move downward. By adjusting element 24 the elastic material of band 31 will retain the piston in a balanced position but as band 31 begins to flow or yield it permits the movement of piston 19 downward to thus extrude or dispense the flowable material 25.

Referring to FIG. 7 there is also illustrated a dispensing device 15 similarly comprised of a tube 16 with a closed end 21 and provided with a dispensing end 17 that is provided with a dispensing port 18 and the tube is provided with a piston 19. However, in this embodiment there is provided a compression spring 20 above piston 19 and a compressible material 35 below piston 19. In this instance the compressible material 35 must be first compressed to a degree to produce the desired static load on spring 20. This may be accomplished by threadably securing the end 17 to the tubular element 16. Thus when spring 20 has been loaded to a proper degree of compression, the compressible material 35 will under a constant load, flow or deform to produce a movement of piston 19 downward and if the fluid 25 is loaded within the lower chamber with the compressible material, the movement of piston 19 downward will produce an extrusion or dispensing of flowable material 25. To prevent a clogging of the dispensing port 18, a strainer 36 may be used.

Referring to FIG. 8 there is also illustrated a dispensing device 15 similarly comprised of a tube 16 with a closed end 21 and provided with a dispensing end 17 that is provided with a dispensing port 18 and in this embodiment there is provided a diaphragm 40. The diaphragm may be mounted by dividing tube 16 into an upper and lower portion and flanging the divided area and utilizing the flanges 41 as the means of retaining the diaphragm 40. The flanges may be clamped or bolted together to provide a fluid seal. A valve stem 30 may be mounted in the upper wall 21. Thus this embodiment may be similar to the embodiment of FIG. 4 except that a diaphragm 40 is used instead of a piston as in the prior embodiment. The upper chamber may be filled to a predetermined pressure that will load diaphragm 40 to its deflection limit. The diaphragm is constructed to resist deflection or stretching under an initial force but however it will deflect or stretch under a continued force in one direction. This may be accomplished by constructing the diaphragm of an elastic material and reinforcing the diaphragm with an elastic or yieldable element to permit a slow deflection under a continuing stress. As the diaphragm stretches, it moves downward and extrudes or dispenses the flowable material from the lower chamber as in the previous embodiments.

Referring to FIG. 9 there is also illustrated a dispensing device 15 similarly comprised of a tube 16 with a closed end 21 and provided with a dispensing end 17 that is provided with a dispensing port 18 and the tube is provided with a piston 19. However, in this embodiment there is a compression spring 20 positioned above the piston 19 and a blade 42 positioned below piston 19. The blade rests upon a block 43 and the lower chamber is filled with a fluid to be dispensed. Spring 20 will exert a downward force on blade 42. The rate of movement of the blade through the block may be governed by the particular material utilized in block 43 so that there is an exceedingly slow flow, separation, give or yield of material 43 under the downward force of blade 42. The blade 42 may be a blunt edge such as passing through wax or a sharp edge such as passing through a cuttable material like hard rubber depending upon the composition of block 43 and the desired rate of separation of the block 43 by the blade to produce a slow rate of movement of the blade downward. The blade 42 may also be replaced by a blunt or sharp pointed rod or plunger that will penetrate the block 43. In this instance there will be a flow or yield of the material in block 43 under the constant downward pressure of the penetrating object such as a pin being forced through rubber or other such material. Thus as piston 19 moves downward the flowable material 25 will be extruded or dispensed as in the previous amendments.

Referring to FIG. 10 there is also illustrated a dispensing device 15 similarly comprised of a tube 16 with a closed end 21 and provided with a dispensing end 17 that is provided with a dispensing port 18 and the tube is provided with a piston 19. However, in this embodiment piston 19 is provided with a piston rod 46 extending above piston 19. There are also provided a pair of solenoids or electro-magnetic coils 47 and 48, coil 47 having a downward thrust surrounding rod 46 while coil 48 also surrounding rod 46 and has an upward thrust. Coil 47 is connected through a battery 50 while coil 48 is connected through a battery 51; thus the batteries 50 and 51 will provide the necessary potential to produce an equal electro-magnetic force in opposite directions on piston rod 46, that is, with the electro-magnetic forces equal, piston 19 will remain in the position as illustrated in FIG. 11. The lower chamber may be filled with a flowable material 25 that is to be dispensed. If batteries 50 and 51 produce an equal potential initially but are of a different potential life, for example, if battery 50 is a 24-hour battery while battery 51 has a 3-hour life, it is apparent that with both batteries producing the electro-magnetic forces in coils 47 and 48 that as battery 51 breaks down, the electro-magnetic force of coil 47 will overcome the electro-magnetic force of coil 48 and piston 19 will move downward and of course the movement of piston 19 is limited to the thrust produced by coil 47 and during this thrust the liquid 25 will be extruded or dispensed.

Referring to FIG. 11 there is also illustrated a dispensing device 15 similarly comprised of a tube 16 with a closed end 21 and provided with a dispensing end 17 that is provided with a dispensing port 18 and the tube is provided with a piston 19. However in this embodiment there are combined two of the previous embodiments, that is, the electro-magnetic thrust may be utilized on piston 19 while a mechanical thrust produced by a compression spring 20 may also be utilized. The electro-magnetic thrust is produced as in the prior embodiment by a coil 47 surrounding a piston rod 46 and the coil 47 being supplied by a potential from battery 50. Thus in this embodiment piston 19 will be maintained in the position as illustrated initially by the energy from battery 50 maintaining an upward thrust on piston rod 46 while spring 20 maintains a downward thrust to thus hold spring 20 under a static loading as illustrated. However as the potential is drained from battery 50, the electro-magnetic thrust will be reduced while the mechanical force of spring 20 remains constant. Thus piston 19 will move downward as the potential of battery 50 is consumed and the flowable material 25 in the lower chamber will be extruded or dispensed as in the previous embodiments.

Referring to FIG. 12 there is also illustrated a dispensing device 15 similarly comprised of a tube 16 with a closable end 21 and provided with a dispensing end 17 that is provided with a dispensing port 18 and the tube is provided with a stretchable membrane or diaphragm 40. However in this embodiment there is provided in the upper chamber above the diaphragm a chemical such as sodium bicarbonate. The upper chamber is closed by a threadably secured top 21¹. By removing top 21¹ a bag 50 retaining a fluid such as water may be clamped in a sealed relationship by cover 21¹. Thus in the position as illustrated in FIG. 12, the fluid (water) is retained separate from the chemical resting upon the membrane or diaphragm 40 and the flowable material 25 that is to be dispensed fills the lower chamber. To promote a chemical reaction it is necessary that the fluid be introduced into the chemical (sodium bicarbonate). The manner of accomplishing this may be either by a valve or by the simple expedient of piercing the bag 60. For example a needle 61 may be positioned through the top 21¹ and held in a retracted position by a spring 62. When the chemical reaction is desired a simple pressure on needle 61 may produce a single piercing of bag 60 or the needle may be used to produce a plurality of piercings of bag 60. With bag 60 pierced due to the air being allowed to pass around needle 61 into bag 60, the fluid (water) will drip through the pierced aperture or apertures and at a slow rate the fluid will mix with the chemical (sodium bicarbonate) producing a chemical reaction which releases a carbon dioxide gas, the gas pressure building up with the upper chamber and producing the desired force to press the membrane or diaphragm 40 downward and thus extrude or dispense the flowable material 25 in the lower chamber. In this embodiment and in any of the other embodiments, a threaded cap 63 may be used to seal port 18 to retain the flowable material 25 before the dispensing device 15 is mounted for use. It is to be understood that in every instance the dispensing action will be delayed but having once started it will continue at a predetermined slow rate.

Referring to FIG. 13 there is also illustrated a dispensing device 15 similarly comprised of a tube 16 with a closed end 21 and provided with a dispensing end 17 that is provided with a dispensing port 18 and the tube is provided with a piston 19. However in this embodiment the upper chamber is filled with a compressible gas and the upper end is provided with a valve and neck portion 30 extending through the upper wall 21. The compressed gas will press downward upon piston 19 and the lower chamber is provided with a compressible material 35 and filled with the flowable material 25, as in the previous embodiment FIG. 7, that is to be dispensed. Thus with the constant pressure of the upper chamber, piston 19 will press down upon the compressible material 35 which will under a constant load, flow or deform to produce a movement of piston 19 downward to dispense the flowable material.

In all of the embodiments above described the tubular structure 16 must be of a rigid material that will give the necessary structural strength to contain the pressures or forces that are to be utilized. However although the common structure most adaptable to this use may be metal or plastic other variations may be utilized such as a clear plastic or a clear glass in this instance the internal action or movement may be visually indicated. The device may be capped to safely seal the container to retain everything in a static condition until the device is ready for use except that in FIGS. 10 and 11 the battery or batteries must not be connected until the device is ready for use. In FIG. 12 the actual piercing of bag 60 must occur when the device is ready for use. Although a piston has been shown in most of the embodiments, a diaphragm may be used instead of a piston without departing from the spirit of this invention. Referring to the various embodiments illustrated and disclosed there may be other combinations of forces whether mechanical, fluid, chemical or electrical to achieve the same result wherein either opposed forces have been mounted to react in a slow fashion to produce a single force in one direction or where a force has been restrained by a material to produce a slow movement or force in one direction, these ultimate single direction slow acting forces have been applied to a dispenser for the purpose of this invention. However each and every one of the embodiments disclosed may be utilized in the same manner for an entirely different purpose without departing from the spirit of this invention and this invention shall be limited only by the appended claims.

What is claimed is:

1. In a fluid dispenser, a cylinder closed at one end, a piston positioned with said cylinder and dividing said cylinder into a dispensing chamber and a spring chamber, a dispensing aperture in the end of said dispensing chamber opposite to said piston, a compression spring mounted within said spring chamber to abut with said movable piston at one end and abut with the closed end of said cylinder at its opposite end, and a tension spring also mounted in the same chamber with said compression spring, said tension spring attached at one end to said piston and attached at its opposite end to the closed end of said cylinder, said dispensing chamber filled with a viscous flowable material, said compression spring having a pushing thrust equal to the pulling force of said tension spring initially and said tension spring loaded to its elastic limit initially, said tension spring stretching further under a cold flow deflection after its elastic limit has been reached, said compression spring dispensing said flowable material by moving said piston during the further deflection of said tension spring.

2. In a fluid dispenser, a cylinder closed at one end, a piston positioned within said cylinder and dividing said cylinder into a dispensing chamber and a spring chamber, a dispensing aperture in the end of said dispensing chamber opposite to said piston, a gas under pressure loaded within said spring chamber, and a tension spring also mounted in the same chamber, said tension spring attached at one end to said piston and attached at its opposite to the closed end of said cylinder, said dispensing chamber filled with a viscous flowable material, said compressed gas having a thrust equal to the pull of said tension spring initially and said tension spring loaded to its elastic limit initially, said tension spring stretching further under a cold flow deflection after its elastic limit has been reached, said compressed gas dispensing said flowable material by moving said piston during the further deflection of said tension spring.

References Cited by the Examiner

UNITED STATES PATENTS

| | | | |
|---|---|---|---|
| 921,130 | 5/09 | Lockwood | 128—218 |
| 1,308,258 | 7/19 | Rose | 222—340 X |
| 1,976,903 | 10/34 | Tear | 222—256 X |
| 2,278,253 | 3/42 | Ellsworth | 222—341 |
| 2,699,167 | 1/55 | Raiche | 128—216 |
| 2,872,083 | 2/59 | Murphy et al. | 222—389 X |
| 2,904,830 | 9/59 | Mulrooney. | |
| 3,051,173 | 8/62 | Johnson et al. | 128—218.2 |

LOUIS J. DEMBO, *Primary Examiner.*

RAPHAEL M. LUPO, *Examiner.*